United States Patent
Shillingford et al.

(10) Patent No.: US 11,250,838 B2
(45) Date of Patent: Feb. 15, 2022

(54) CROSS-MODAL SEQUENCE DISTILLATION

(71) Applicant: DeepMind Technologies Limited, London (GB)

(72) Inventors: Brendan Shillingford, London (GB); Ioannis Alexandros Assael, London (GB); Joao Ferdinando Gomes de Freitas, London (GB)

(73) Assignee: DeepMind Technologies Limited, London (GB)

( * ) Notice: Subject to any disclaimer, the term of this patent is extended or adjusted under 35 U.S.C. 154(b) by 57 days.

(21) Appl. No.: 16/687,558

(22) Filed: Nov. 18, 2019

(65) Prior Publication Data

US 2020/0160843 A1 May 21, 2020

(30) Foreign Application Priority Data

Nov. 16, 2018 (GR) .............................. 20180100524

(51) Int. Cl.
| | |
|---|---|
| *G10L 15/06* | (2013.01) |
| *G10L 15/02* | (2006.01) |
| *G10L 15/24* | (2013.01) |
| *G10L 15/22* | (2006.01) |

(52) U.S. Cl.
CPC ............ *G10L 15/063* (2013.01); *G10L 15/02* (2013.01); *G10L 15/22* (2013.01); *G10L 15/24* (2013.01); *G10L 2015/025* (2013.01)

(58) Field of Classification Search
CPC ....... G10L 15/063; G10L 15/02; G10L 15/22; G10L 15/24; G10L 2015/025
See application file for complete search history.

(56) References Cited

U.S. PATENT DOCUMENTS

| | | | |
|---|---|---|---|
| 10,332,509 B2* | 6/2019 | Catanzaro | G10L 25/21 |
| 2008/0319973 A1* | 12/2008 | Thambiratnam | G06F 16/313 |
| 2018/0365532 A1* | 12/2018 | Molchanov | G06K 9/46 |
| 2018/0374029 A1* | 12/2018 | Henry | G06N 3/08 |
| 2019/0130275 A1* | 5/2019 | Chen | G06N 3/0454 |
| 2020/0090031 A1* | 3/2020 | Jakkam Reddi | G06N 3/08 |
| 2020/0342857 A1* | 10/2020 | Moreno | G10L 15/20 |
| 2021/0110115 A1* | 4/2021 | Hermann | G06F 40/30 |

OTHER PUBLICATIONS

Graves et al., "Connectionist temporal classification: labelling unsegmented sequence data with recurrent neural networks," Proceedings of the 23rd International Conference on Machine Learning, Jun. 2006, 369-376.

(Continued)

*Primary Examiner* — Michael Colucci
(74) *Attorney, Agent, or Firm* — Fish & Richardson P.C.

(57) ABSTRACT

Methods, systems, and apparatus, including computer programs encoded on a computer storage medium, for training a video speech recognition model having a plurality of model parameters on a set of unlabeled video-audio data and using a trained speech recognition model. During the training, the values of the parameters of the trained audio speech recognition model fixed are generally fixed and only the values of the video speech recognition model are adjusted. Once being trained, the video speech recognition model can be used to recognize speech from video when corresponding audio is not available.

20 Claims, 3 Drawing Sheets

(56) References Cited

OTHER PUBLICATIONS

Hinton et al., "Distilling the Knowledge in a Neural Network," https://arxiv.org/abs/1503.02531, Mar. 2015, 9 pages.
Kim et al., "Sequence-Level Knowledge Distillation," CoRR, Sep. 2016, arxiv.org/abs/1606.07947v4, 11 pages.
Shillingford et al., "Large-Scale Visual Speech Recognition," https://arxiv.org/abs/1807.05162vl, Jul. 2018, 19 pages.

* cited by examiner

CROSS-MODAL SEQUENCE DISTILLATION

CROSS-REFERENCE TO RELATED APPLICATION

This application claims the benefit under 35 U.S.C. § 119(a) of the filing date of Greek Patent Application No. 20180100524, filed in the Greek Patent Office on Nov. 16, 2018. The disclosure of the foregoing application is herein incorporated by reference in its entirety.

BACKGROUND

This specification relates to training a sequence transduction machine learning model using a different, trained sequence transduction machine learning model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

Particular embodiments of the subject matter described in this specification can be implemented so as to realize one or more of the following advantages.

Training a video speech recognition model can be difficult because training data for training these models can be difficult to obtain. In particular, large numbers of high quality speech recognition labels for videos are difficult or impossible to obtain. However, large amounts of unsupervised video-audio data are readily available. For example, large amounts of video and corresponding audio of human speech are readily available through video-sharing websites or other services while very few of these videos are associated with accurate closed captioning or other transcriptions. The described techniques allow a video speech recognition model to effectively be trained on this unsupervised video-audio data without requiring labeled video data. In particular, by making use of a trained audio speech recognition model, the video speech recognition model can be trained to achieve state of the art performance in an unsupervised manner and even though accurate labels of the type that the model is configured to generate are unavailable (i.e., transcriptions of video). The described techniques can be used to distill a teacher audio speech recognition model into a student video speech recognition model, even when the two models are not temporally aligned, do not use the same vocabulary, or are not both character/word/phoneme-level, i.e., if one makes predictions over phonemes while the other makes predictions over characters. The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a video speech recognition machine learning model. In particular, to effectively train the video speech recognition model, the system makes use of an already trained audio speech recognition machine learning model. The system trains the audio speech recognition model on a set of unlabeled video-audio data using the trained audio speech recognition model. During the training, the system generally keeps the values of the parameters of the trained audio speech recognition model fixed and only adjusts the values of the video speech recognition model.

Figure 1:
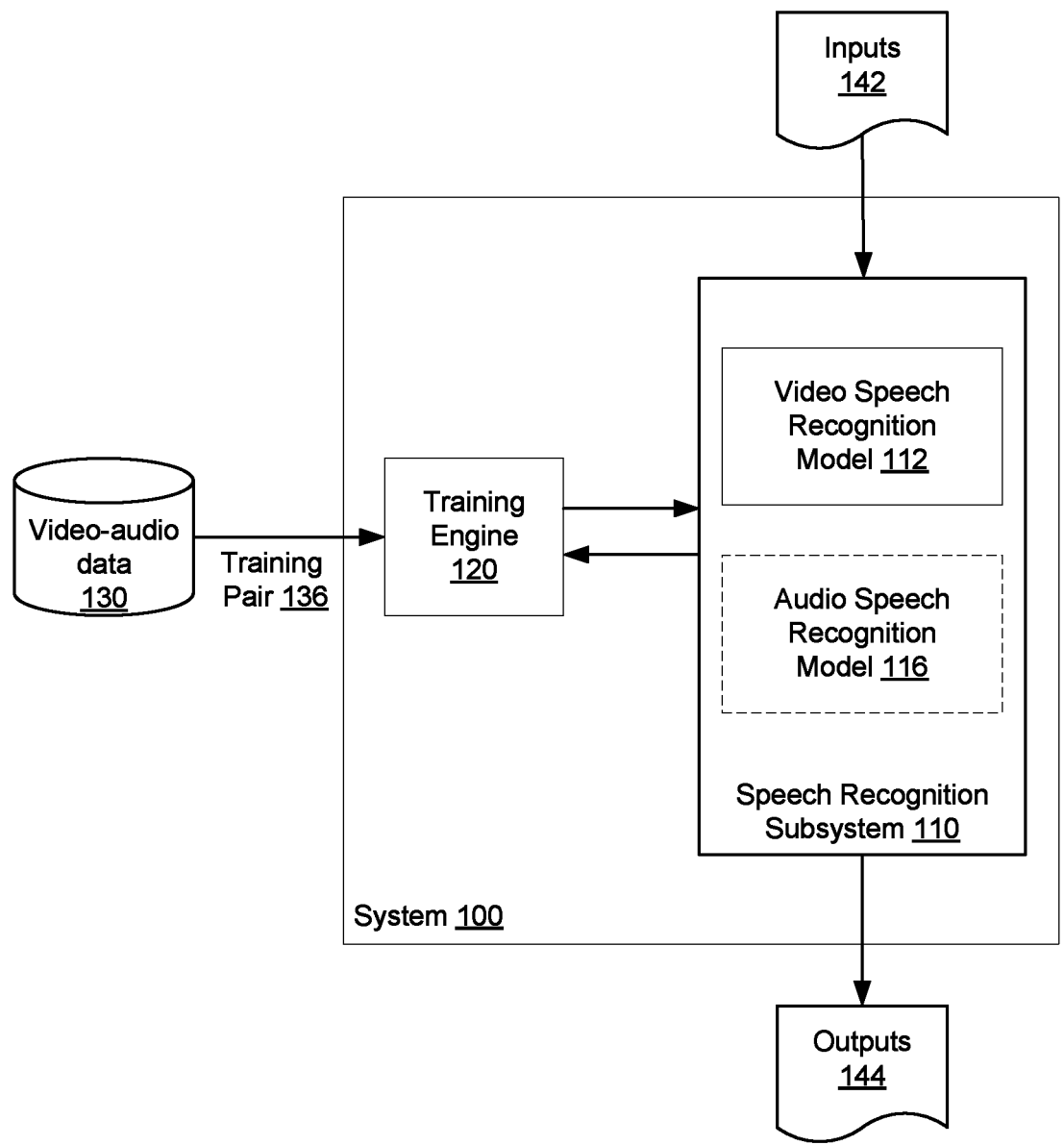
FIG. 1 shows an example system.

FIG. 1 shows an example system 100. The system 100 is an example of a system implemented as computer programs on one or more computers in one or more locations, in which the systems, components, and techniques described below are implemented.

In general, the system 100 is a sequence transduction machine learning system that receives a sequence of system inputs 142 and generates a sequence of system outputs 144 from the sequence of system inputs 142. The system 100 can store the generated sequence of outputs in an output data repository or provide the sequence of outputs for use for some other immediate purpose.

More specifically, the system 100 includes a speech recognition subsystem 110. The speech recognition subsystem 110 in turn includes a video speech recognition model 112, also referred to as a student model. The video speech recognition model 112 is a model that is configured to recognize speech from videos of utterances being spoken, i.e., from a sequence of video frames that does not include audio data. That is, the model maps a sequence of video frames to a sequence of speech recognition outputs, i.e., to a sequence of phonemes, to a sequence of natural language characters, or a sequence of words. Examples of such models include the neural networks described in "Large-Scale Visual Speech Recognition," Brendan Shillingford, et al, available at https://arxiv.org/abs/1807.05162.

Referring to the video speech recognition model 112 as a student model indicates that the parameters of the model 112 have initial values that need to be updated, i.e., through training, to ensure a satisfying performance of the model 112 on relevant video speech recognition tasks.

In particular, a training engine 120 in the system 100 trains the video speech recognition model 112 to determine trained values of the model parameters from initial values of the model parameters using an iterative training process.

At each iteration of the training process, the training engine 120 determines a parameter value update to the current model parameter values and then applies the update to the current model parameter values.

To improve the effectiveness of the training, the system 100 makes use of an already trained audio speech recognition model 116, also referred to as a teacher model. The audio speech recognition model 116 is a model that is configured to recognize speech from audio data, i.e., raw audio data or features derived from audio data, e.g., spectrogram of audio. That is, the model 116 maps a sequence of raw audio or audio features to a sequence of speech recognition outputs.

Referring to the already trained audio speech recognition model 116 as a teacher model indicates that the model 116 has already been trained to generate high quality speech recognition outputs and that the system 100 generally keeps the parameter values of the already trained audio speech recognition model 116 fixed and only adjusts the parameter values of the video speech recognition model 112 during the training of the model 112.

These speech recognition outputs generated by the audio speech recognition model may be the same type or a different type as those generated by the video speech recognition model. For example, both models may generate sequences of phonemes or one model may generate sequences of phonemes while the other generates sequences of characters or words.

In general, the video speech recognition model 112 and the trained audio speech recognition model 116 are each a respective sequence transduction machine learning model that can be configured, for example, as a feedforward neural network or a recurrent neural network.

In particular, in some implementations, both models 112 and 116 apply a softmax activation function to an intermediate model output (i.e., the output of a layer that precedes the output layer) to generate final speech recognition outputs, respectively. That is, the output layers of both models are each a respective softmax layer that generates a corresponding probability distribution over a vocabulary of possible speech recognition outputs for each of a plurality of output time steps by applying a softmax activation function to the intermediate model output generated by the layer preceding the output layer in the model. Connectionist temporal classification (CTC)-based neural networks, encoder-decoder recurrent neural networks (RNNs), including RNN-Transducer networks, and self-attention-based neural networks are example of such models. The vocabulary of possible speech recognition outputs include, for example, words, characters in natural language alphabet, or phonemes.

In such implementations, adjusting the softmax temperature for the softmax layer changes corresponding probability distribution of the speech recognition outputs. For example, to allow either one of the models 112 and 116 to generate more diverse (but potentially, less confident) speech recognition outputs, the system 100 can set the corresponding temperature parameter for the softmax layer of the model to a value that is greater than one. The system 100 may, but need not, set respective temperature parameters for the softmax layers of both models 112 and 116 to a same value. To train the video speech recognition model using the trained audio speech recognition model, the system 100 maintains (e.g., in one or more physical data storage devices) a set of unlabeled video-audio data 130. Specifically, the set of unlabeled video-audio data 130 includes multiple audio sequence—video sequence training pairs 136. The audio sequence in each training pair 136 is an audio sequence representing an utterance, e.g., either raw audio or features derived from the raw audio, and the corresponding video sequence in the training pair 136 is a sequence of video frames that show the utterance being spoken. For example, the video sequence in a given pair can depict a person's face while the person is speaking while the audio sequence in the same pair can be the audio of the person speaking.

Training the video speech recognition model 112 using the trained audio speech recognition model 116 on the set of unlabeled video-audio data 130 will be described in more detail below with reference to FIGS. 2 and 3.

To mitigate any difference between the respective vocabularies of the possible audio and video speech recognition outputs, during the training, the system can also train a separate mapping model to learn a mapping between them. In other words, in some implementations, the system also trains a mapping model that is configured to transform the outputs of the audio speech recognition model into corresponding outputs of the video speech recognition model. The mapping model can perform the transformation, for example, as a one-to-one mapping, a one-to-many mapping, a many-to-one mapping, or a probability distribution.

Once training has completed, the system 100 can use the video speech recognition model 112 to generate an output sequence 144 specifying speech that has been accurately recognized from videos of the speech utterances being spoken, i.e., from a input sequence 142 of video frames that does not include audio data and without using the trained audio speech recognition model 116. That is, once trained, the video speech recognition model 112 can be used to recognize speech from video when corresponding audio is not available.

It should be noted that, while the description in this specification largely relates to training a video speech recognition model using a trained audio speech recognition model, the described techniques can also be used for other kinds of cross-modality distillation training. For example, a trained audio speech recognition model can be used to train an untrained audio-visual speech recognition model, i.e., a model that is configured to recognize speech from both video and corresponding audio data. As another example, a trained audio speech recognition model can be used to train an untrained audio speech recognition model that is different in some respect from the trained model, e.g., in cases where the two models are not temporally aligned, do not use the same vocabulary, or are not both character/word/phoneme-level, i.e., if one makes predictions over phonemes while the other makes predictions over characters.

Figure 2:
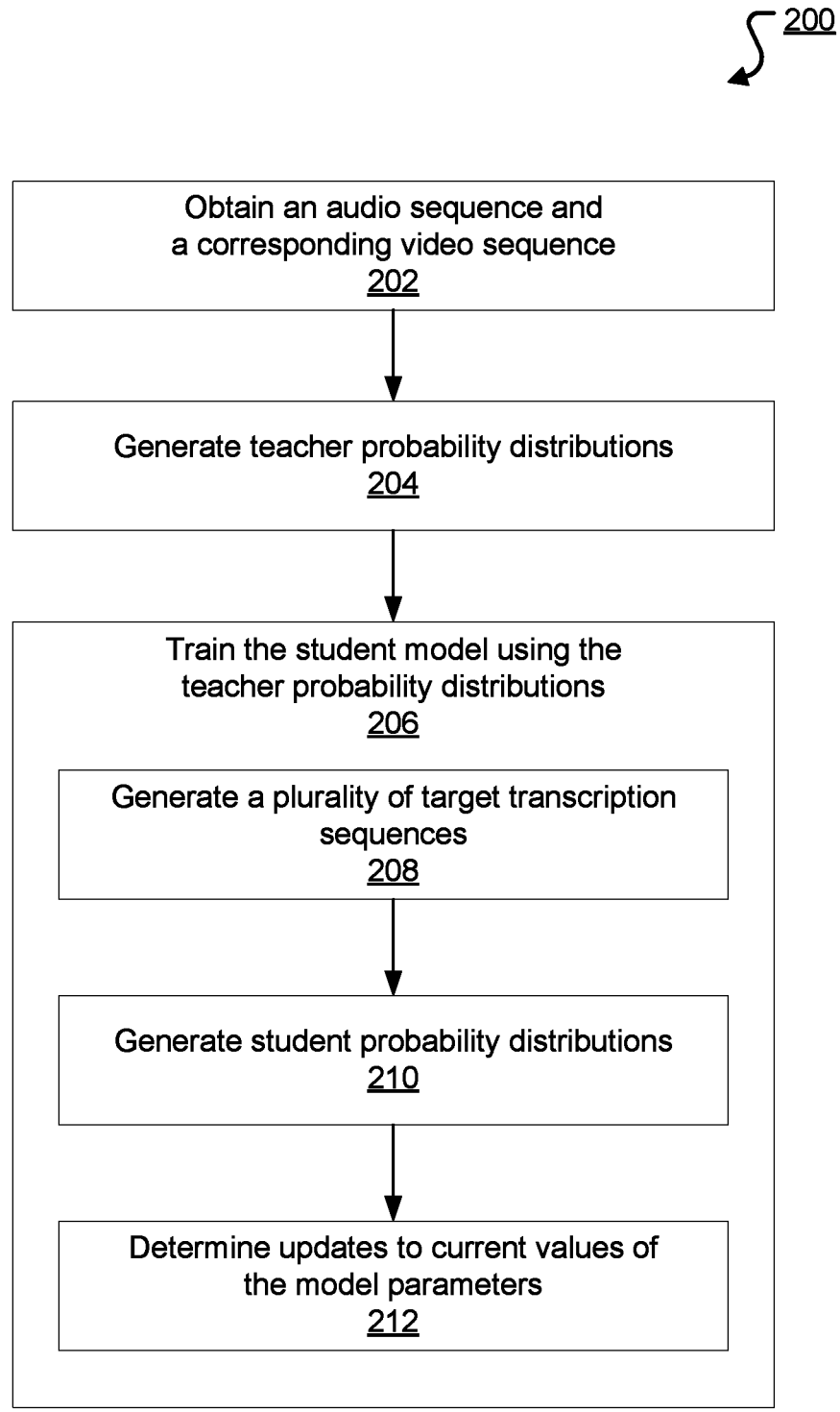
FIG. 2 is a flow diagram of an example process for training a video speech recognition model.

FIG. 2 is a flow diagram of an example process 200 for training a video speech recognition model. For convenience, the process 200 will be described as being performed by a system of one or more computers located in one or more locations. For example, a system, e.g., the system 100 of FIG. 1, appropriately programmed in accordance with this specification, can perform the process 200.

In general, the system can repeatedly perform the process 200 for different training pairs in order to train the video speech recognition model by repeatedly updating the values of the model parameters.

The system obtains a training pair (202) that includes (i) an audio sequence representing an utterance and (ii) a corresponding video sequence of the utterance being spoken.

The audio sequence can be raw audio or features derived from the raw audio of the utterance being spoken, and the video sequence can be a sequence of video frames that shows the utterance being spoken. In particular, the video sequence does not include audio data.

For example, the video sequence in a given training pair can be a visual-only, multi-frame video depicting a person's face while the person is speaking, while the audio sequence in the same training pair can be a corresponding audio track of the video. The audio track stores the audio of the person speaking.

The system processes the audio sequence using a trained audio speech recognition model to generate a respective teacher probability distribution (204) over a vocabulary of possible audio speech recognition outputs for each of a first plurality of output time steps.

Specifically, at each of the first plurality of output time steps, the system applies a softmax activation function over an intermediate model output generated by the layer preceding the output layer in the model to generate a corresponding teacher probability distribution over the vocabulary of possible audio speech recognition output at the output time step.

The vocabulary of possible audio speech recognition outputs refers to a class of possible outputs that can be generated by the audio speech recognition model. The possible audio speech recognition outputs include, for example, words, characters in natural language alphabet, or phonemes. Optionally, the possible audio speech recognition outputs further include one or more special outputs, including a blank output.

At each of the first plurality of output time steps, the corresponding teacher probability distribution specifies a respective likelihood that each possible output in the vocabulary is to be selected, i.e., as the speech that is recognized from the audio sequence representing the utterance being spoken. Typically, for each possible output, the corresponding likelihood ranges from 0 to 1, either inclusive or exclusive.

The system trains the video speech recognition model using the teacher probability distributions (206) generated by the trained audio speech recognition model.

Briefly, training the video speech recognition model includes generating a plurality of target transcription sequences (208), generating student probability distributions (210), and determining updates to current values of the model parameters (212). In general, during the training, the system keeps the values of the parameters of the trained audio speech recognition model fixed and only adjusts the values of the video speech recognition model.

As will be described in more detail below with reference to FIG. 3, the system generates a plurality of target transcription sequences (208) using the teacher probability distributions.

The system processes the corresponding video sequence using the video speech recognition model in accordance with current values of the model parameters to generate a respective student probability distribution (210) over a vocabulary of possible video speech recognition outputs for each of a second plurality of output time steps.

Specifically, at each of the second plurality of output time steps, the system applies a softmax activation function over an intermediate model output generated by the layer preceding the output layer in the model to generate a corresponding student probability distribution over the vocabulary of possible video speech recognition output at the output time step.

The vocabulary of possible video speech recognition outputs refers to a class of possible outputs that can be generated by the video speech recognition model. The possible video speech recognition outputs include, for example, words, characters in natural language alphabet, or phonemes. Optionally, the possible video speech recognition outputs further include one or more special outputs, including a blank output.

At each of the second plurality of output time steps, the corresponding student probability distribution specifies a respective likelihood that each possible output in the vocabulary is to be selected under a generated target transcription sequence, i.e., as the speech that is recognized from the video sequence representing the utterance being spoken.

The video speech recognition model may, but need not, align temporally with audio speech recognition model. In other words, for each training pair, the first plurality of output time steps that is specified by the audio speech recognition outputs can include a different number of time steps than the second plurality of output time steps that is specified by the video speech recognition outputs.

Although they can be the same, the vocabulary of possible audio speech recognition outputs can be different from the vocabulary of possible video speech recognition outputs. That is, in general, the audio speech recognition model and the video speech recognition model each have a respective class of possible outputs.

The system determines a respective update to the current values of the model parameters (212) for each of the plurality of target transcription sequences.

In particular, for each target transcription sequence, the system determines a gradient of a loss between the target transcription sequence and the student probability distributions with respect to the video speech recognition model parameters.

In general, the system can compute the loss using any appropriate loss function that evaluates a measure of difference between the target transcription sequence and the student probability distributions.

As a particular example, the system can compute the loss using connectionist temporal classification (CTC) loss function. Computing the CTC loss is described in more detail in "Connectionist temporal classification: labelling unsegmented sequence data with recurrent neural networks," Alex Graves, et al, in ICML, pages 369-376, 2006.

To compute the CTC loss, the system determines, for each target transcription sequence, a respective negative log-likelihood of the target transcription sequence according to the student probability distributions.

Specifically, the system determines each negative log-likelihood by marginalizing over candidate transcription sequences that are equivalent to the target transcription sequence. The system can generate the candidate transcription sequences from the respective student probability distributions for the second plurality of output time steps. In other words, for each target transcription sequence, the system combines, e.g., computes a sum between, all student probability distributions that match the sampled speech recognition outputs. Matching can be defined as, for example, when the respective video speech recognition outputs specified by the student probability distributions are consistent with the respective sampled audio speech recognition outputs specified by the target transcription sequence.

The system then approximates the respective CTC loss between each of the plurality of target transcription sequences and the student probability distributions using the negative log-likelihood determined for the target transcription sequences. Mathematically, the approximated CTC loss for a given target transcription sequence can be represented as:

$$\mathcal{L} \approx \log p(u_1 u_2 \ldots u_T | u_T | x_v; \theta),$$

where T is equal to a total number of the first plurality of output time steps, $u_t$ is the corresponding sampled speech recognition output in the given target transcription sequence at a given output time step t, $x_v$ is the video sequence from the training pair, and θ corresponds to the parameters of the video speech recognition model.

In some implementations, the system combines, e.g., computes a sum between, the respective negative log-likelihoods to approximate a combined CTC between the plurality of target transcription sequences and the student probability distributions. In particular, while the system can compute either weighted or unweighted sums between the respective likelihoods, for convenience, the system is only described to compute unweighted sums. In such cases, an approximation of the combined CTC loss for the plurality of target transcription sequences can be represented as:

$$\mathcal{L} \approx -\frac{1}{N}\sum_{i=1}^{N} \log p(u_1^{(i)} u_2^{(i)} \ldots u_T^{(i)} \mid x_v; \theta),$$

where N is equal to a total number of the plurality of target transcription sequences, T is equal to a total number of the first plurality of output time steps, $u_t^{(i)}$ is a corresponding sampled speech recognition output in a given target transcription sequence i at a given output time step t, $x_v$ is the video sequence from the training pair, and $\theta$ corresponds to the parameters of the video speech recognition model.

The system also determines a corresponding gradient of the approximated CTC loss with respect to the parameters of the video speech recognition model:

$$\nabla_\theta \mathcal{L} \approx \nabla_\theta \log p(u_1 u_2 \ldots u_T \mid x_v; \theta)$$

Alternatively, in some implementations where the system determines a combined CTC loss for the plurality of target transcription sequences, the system determines a corresponding gradient of the combined approximated loss:

$$\nabla_\theta \mathcal{L} \approx -\frac{1}{N}\sum_{i=1}^{N} \nabla_\theta \log p(u_1^{(i)} u_2^{(i)} \ldots u_T^{(i)} \mid x_v; \theta).$$

The system then proceeds to determine the update to current values of model parameters from the determined gradient, e.g., in accordance with an update rule being used for the training of the model, e.g., a stochastic gradient descent update rule, an Adam update rule, an rmsProp update rule, or a learned update rule.

Figure 3:
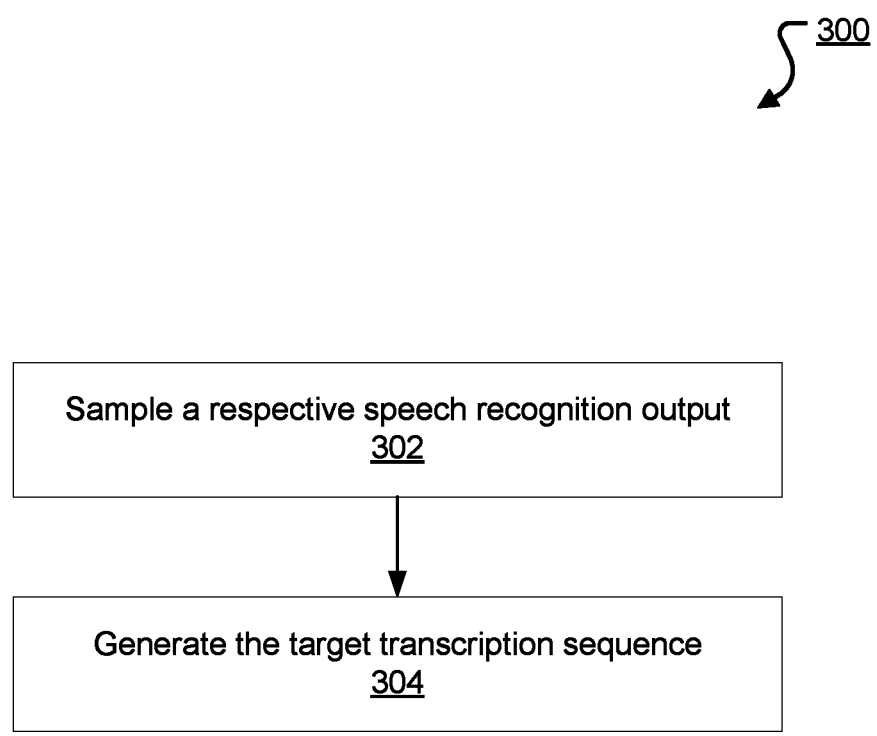
FIG. 3 is a flow diagram of an example process for generating a target transcription sequence.

FIG. 3 is a flow diagram of an example process 300 for generating a target transcription sequence. For convenience, the process 300 will be described as being performed by a system of one or more computers located in one or more locations. For example, a system, e.g., the system 100 of FIG. 1, appropriately programmed in accordance with this specification, can perform the process 300.

In general, the system can repeatedly perform the process 300 for the same teacher probability distributions to generate a mini-batch of target transcription sequences. Each mini-batch typically includes a fixed number of target transcription sequences, e.g., 5, 10, or 50.

The system samples a respective speech recognition output (302) for each of the output time steps from the teacher probability distribution for the output time step. As such, respective speech recognition outputs that have been assigned higher probabilities as specified in the teacher probability distributions will have higher likelihoods of being sampled.

In some implementations, at each output time step, the teacher probability distribution that is generated by the audio speech recognition model can be represented as $p(u_t \mid x_\alpha)$, where $x_\alpha$ is the audio sequence from the training pair, and $u_t$ is the speech recognition output at the output time step. The system then independently samples $u_t \sim p(u_t \mid x_\alpha)$ for $t=1, \ldots, T$, where T is equal to a total number of the first plurality of output time steps. In other words, at each output time step, the system samples an independent speech recognition output, i.e., from the vocabulary of possible audio speech recognition outputs, in accordance with the corresponding teacher probability distribution.

The system generates the target transcription sequence (304) using the sampled audio speech recognition outputs for the output time steps. Generating the target transcription sequence typically involves concatenating respective sampled audio speech recognition outputs along a predetermined dimension, e.g., the temporal dimension.

In some implementations, the system compresses respective sampled audio speech recognition outputs when generating the target transcription sequence. Specifically, to perform compression, the system first merges any adjacent duplicate outputs from the sampled audio speech recognition outputs. That is, in every group of adjacent duplicate outputs, the system removes all adjacent duplicate outputs except for one output. Once adjacent duplicate outputs are merged, the system then removes any blank outputs from the sampled audio speech recognition outputs. In this manner, the generated target transcription sequence does not include blank outputs. The generated target transcription sequence also does not include adjacent duplicate outputs that were not separated by a corresponding blank output before compression.

By generating multiple target transcription sequences in this manner, i.e., by taking multiple independent samples at each time step using the teacher probability distributions for the time step, the system effectively trains the video speech recognition model to match entire distributions generated by the audio speech recognition model. This allows the training to be more effective than forming a single maximum-probability prediction from the trained ASR model and then using this as a target. In particular, the described training scheme reduces the possibility that the video speech recognition model will fit to a noisy label by considering the overall distribution of probabilities in each distribution, reducing low-quality or unhelpful parameter updates.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a video speech recognition model having a plurality of model parameters, the method comprising:

obtaining (i) an audio sequence representing an utterance and (ii) a corresponding video sequence of the utterance being spoken;

processing the audio sequence using a trained audio speech recognition model to generate a respective teacher probability distribution over a vocabulary of possible audio speech recognition outputs for each of a first plurality of output time steps; and training the video speech recognition model using the teacher probability distributions generated by the trained audio speech recognition model, comprising:

generating a plurality of target transcription sequences using the teacher probability distributions, the generating comprising, for each target transcription sequence:

sampling a respective speech recognition output for each of the output time steps from the teacher probability distribution for the output time step, and generating the target transcription sequence using the sampled audio speech recognition outputs for the output time steps;

processing the corresponding video sequence using the video speech recognition model in accordance with current values of the model parameters to generate a respective student probability distribution over a vocabulary of possible video speech recognition outputs for each of a second plurality of output time steps; and determining a respective update to the current values of the model parameters for each of the plurality of target transcription sequences by determining a gradient with respect to the model parameters of a loss between the target transcription sequence and the student probability distributions.

2. The method of claim 1, wherein the loss is a CTC loss.

3. The method of claim 1, wherein determining a respective update to the current values of the model parameters for each of the target transcription sequences by determining a gradient with respect to the model parameters of a loss between the target transcription sequence and the student probability distributions comprises:

determining a likelihood of the target transcription sequence according to the student probability distributions by marginalizing over transcription sequences that are equivalent to the target transcription sequence; and determining a gradient of a negative log of the likelihood with respect to the model parameters.

4. The method of claim 1, wherein the vocabulary of possible audio speech recognition outputs include a blank output and wherein generating the target transcription sequence using the sampled audio speech recognition outputs comprises:

removing any blank outputs and any adjacent duplicate outputs from the sampled audio speech recognition outputs.

5. The method of claim 1, wherein the possible audio speech recognition outputs, the possible video speech recognition outputs, or both include phonemes.

6. The method of claim 1, wherein the possible audio speech recognition outputs, the possible video speech recognition outputs, or both include characters in a natural language alphabet.

7. The method of claim 1, wherein the possible audio speech recognition outputs, the possible video speech recognition outputs, or both include words.

8. The method of claim 1, wherein the vocabulary of possible audio speech recognition outputs is different from the vocabulary of possible video speech recognition outputs.

9. The method of claim 1, wherein the audio speech recognition model and the video speech recognition model are not temporally aligned and the first plurality of output time steps includes a different number of time steps than the second plurality of output time steps.

10. The method of claim 1, wherein an output layer of the trained audio speech recognition model is a softmax layer, and wherein processing the audio sequence using a trained audio speech recognition model to generate a respective teacher probability distribution over a vocabulary of possible audio speech recognition outputs for each of a first plurality of output time steps comprises:
processing the audio sequence using the trained audio speech recognition model with a temperature parameter for the softmax layer set to a first value that is greater than one.

11. The method of claim 1, wherein an output layer of the video speech recognition model is a softmax layer and wherein processing the corresponding video sequence using the video speech recognition model in accordance with current values of the model parameters to generate a respective student probability distribution over a vocabulary of possible video speech recognition outputs for each of a second plurality of output time steps comprises:
processing the video sequence using the video speech recognition model with a temperature parameter for the softmax layer set to a second value that is greater than one.

12. The method of claim 11, wherein the first value is the same as the second value.

13. A system comprising:
one or more computers; and
one or more storage devices storing instructions that, when executed by the one or more computers, cause the one or more computers to perform operations for training a video speech recognition model having a plurality of model parameters, the operations comprising:
obtaining (i) an audio sequence representing an utterance and (ii) a corresponding video sequence of the utterance being spoken;
processing the audio sequence using a trained audio speech recognition model to generate a respective teacher probability distribution over a vocabulary of possible audio speech recognition outputs for each of a first plurality of output time steps; and
training the video speech recognition model using the teacher probability distributions generated by the trained audio speech recognition model, comprising:
generating a plurality of target transcription sequences using the teacher probability distributions, the generating comprising, for each target transcription sequence:
sampling a respective speech recognition output for each of the output time steps from the teacher probability distribution for the output time step, and
generating the target transcription sequence using the sampled audio speech recognition outputs for the output time steps;
processing the corresponding video sequence using the video speech recognition model in accordance with current values of the model parameters to generate a respective student probability distribution over a vocabulary of possible video speech recognition outputs for each of a second plurality of output time steps; and
determining a respective update to the current values of the model parameters for each of the plurality of target transcription sequences by determining a gradient with respect to the model parameters of a loss between the target transcription sequence and the student probability distributions.

14. The system of claim 13, wherein determining a respective update to the current values of the model parameters for each of the target transcription sequences by determining a gradient with respect to the model parameters of a loss between the target transcription sequence and the student probability distributions comprises:
determining a likelihood of the target transcription sequence according to the student probability distributions by marginalizing over transcription sequences that are equivalent to the target transcription sequence; and
determining a gradient of a negative log of the likelihood with respect to the model parameters.

15. The system of claim 13, wherein the vocabulary of possible audio speech recognition outputs is different from the vocabulary of possible video speech recognition outputs.

16. The system of claim 13, wherein the audio speech recognition model and the video speech recognition model are not temporally aligned and the first plurality of output time steps includes a different number of time steps than the second plurality of output time steps.

17. One or more non-transitory computer-readable storage media storing instructions that when executed by one or more computers cause the one or more computers to perform operations for training a video speech recognition model having a plurality of model parameters, the operations comprising:
obtaining (i) an audio sequence representing an utterance and (ii) a corresponding video sequence of the utterance being spoken;
processing the audio sequence using a trained audio speech recognition model to generate a respective teacher probability distribution over a vocabulary of possible audio speech recognition outputs for each of a first plurality of output time steps; and
training the video speech recognition model using the teacher probability distributions generated by the trained audio speech recognition model, comprising:
generating a plurality of target transcription sequences using the teacher probability distributions, the generating comprising, for each target transcription sequence:
sampling a respective speech recognition output for each of the output time steps from the teacher probability distribution for the output time step, and
generating the target transcription sequence using the sampled audio speech recognition outputs for the output time steps;
processing the corresponding video sequence using the video speech recognition model in accordance with current values of the model parameters to generate a respective student probability distribution over a vocabulary of possible video speech recognition outputs for each of a second plurality of output time steps; and
determining a respective update to the current values of the model parameters for each of the plurality of target transcription sequences by determining a gradient with respect to the model parameters of a loss between the target transcription sequence and the student probability distributions.

18. The non-transitory computer-readable storage media of claim 17, wherein determining a respective update to the current values of the model parameters for each of the target transcription sequences by determining a gradient with respect to the model parameters of a loss between the target transcription sequence and the student probability distributions comprises:
- determining a likelihood of the target transcription sequence according to the student probability distributions by marginalizing over transcription sequences that are equivalent to the target transcription sequence; and
- determining a gradient of a negative log of the likelihood with respect to the model parameters.

19. The non-transitory computer-readable storage media of claim 17, wherein the vocabulary of possible audio speech recognition outputs is different from the vocabulary of possible video speech recognition outputs.

20. The non-transitory computer-readable storage media of claim 17, wherein the audio speech recognition model and the video speech recognition model are not temporally aligned and the first plurality of output time steps includes a different number of time steps than the second plurality of output time steps.

* * * * *